(12) United States Patent
Gupta

(10) Patent No.: US 12,437,425 B2
(45) Date of Patent: Oct. 7, 2025

(54) COMPUTER-IMPLEMENTED METHOD FOR DETERMINING AN AFFINE TRANSFORMATION

(71) Applicant: Identy Inc., Dover, DE (US)

(72) Inventor: Hardik Gupta, Dover, DE (US)

(73) Assignee: Identy Inc., Dover, DE (US)

( * ) Notice: Subject to any disclaimer, the term of this patent is extended or adjusted under 35 U.S.C. 154(b) by 0 days.

(21) Appl. No.: 18/395,304

(22) Filed: Dec. 22, 2023

(65) Prior Publication Data

US 2025/0200769 A1 Jun. 19, 2025

(30) Foreign Application Priority Data

Dec. 14, 2023 (EP) ..................................... 23216728

(51) Int. Cl.
*G06V 40/13* (2022.01)
*G06T 3/4046* (2024.01)
*G06T 7/33* (2017.01)
*G06V 10/77* (2022.01)
*G06V 10/82* (2022.01)
*G06V 40/12* (2022.01)

(52) U.S. Cl.
CPC ............ *G06T 7/337* (2017.01); *G06T 3/4046* (2013.01); *G06V 10/7715* (2022.01); *G06V 10/82* (2022.01); *G06V 40/1353* (2022.01); *G06T 2207/20048* (2013.01); *G06T 2207/20084* (2013.01); *G06T 2207/20212* (2013.01); *G06T 2207/30196* (2013.01)

(58) Field of Classification Search
None
See application file for complete search history.

(56) References Cited

U.S. PATENT DOCUMENTS

| | | | |
|---|---|---|---|
| 2016/0042516 A1* | 2/2016 | Tieu | G06V 40/13 |
| | | | 382/203 |
| 2022/0094968 A1 | 3/2022 | Goswami et al. | |
| 2023/0222676 A1 | 7/2023 | Jafari-Khouzani et al. | |
| 2024/0070249 A1* | 2/2024 | Thiebot | G06V 40/1359 |

OTHER PUBLICATIONS

Extended European Search Report dated Jun. 3, 2024, in connection with European Application No. 23216728.8, 12 pages.

(Continued)

*Primary Examiner* — Joseph R Haley

(57) ABSTRACT

A computer-implemented method for determining an affine transformation for transforming a second image so that features of the second image coincide with corresponding features of a first image, the computer-implemented method comprising obtaining the second image comprising the features and obtaining the first image comprising the corresponding features, processing the images by a transformation calculator, thereby determining an indication of whether the affine transformation exists and determining parameters defining the affine transformation, and outputting the affine transformation, comprising outputting the indication of whether the affine transformation exists and outputting a data structure indicative of the parameters defining the affine transformation.

17 Claims, 5 Drawing Sheets

(56) References Cited

OTHER PUBLICATIONS

Dadar, et al., "A comparison of publicly available linear MRI stereotaxic registration techniques," NeuroImage, vol. 174, Mar. 13, 2018, Amsterdam, NL, 10 pages.

He, et al., "Partial Fingerprint Verification via Spatial Transformer Networks," 2020 IEEE International Joint Conference on Biometrics (IJCB), IEEE, Sep. 28-Oct. 1, 2020, 10 pages.

Fonov, et al., "DARQ: Deep learning of quality control for stereotaxic registration of human brain MRI to the T1w MNI-ICBM 152 template," NeuroImage, vol. 257, Aug. 1, 2022, Amsterdam, NL, 12 pages.

* cited by examiner

COMPUTER-IMPLEMENTED METHOD FOR DETERMINING AN AFFINE TRANSFORMATION

CROSS-REFERENCE TO RELATED APPLICATION(S) AND CLAIM OF PRIORITY

This application claims priority to European Patent Application No. 23216728.8, filed Dec. 14, 2023, the disclosure of which is incorporated herein by reference in its entirety.

TECHNICAL FIELD

The present disclosure relates to a computer-implemented method for determining an affine transformation for transforming a second image so that features of the second image coincide with corresponding features of the first image and a computing device comprising a processor and a storage device.

BACKGROUND

Image merging or combination is an approach that is commonly applied in the art. For example, in the context of user identification, separate images of a user each bearing biometric features (like minutiae) can be combined so as to more reliably determine the identity of the user. These approaches, however, usually require high accuracy when taking the images by a user. This makes these methods less user-friendly and further results in less accurate user identification or erroneous identifications due to lack of proper alignment of the respective images.

SUMMARY

Starting from the known prior art, one object of the present disclosure provides a computer-implemented method and a computing system that allows for more user-friendly alignment of images taken while at the same time providing high accuracy with respect to the relative alignment of the images.

This problem is solved by the computer-implemented method for determining an affine transformation for transforming a second image so that features of the second image coincide with corresponding features of a first image, and a computing device.

According to this disclosure, a computer-implemented method for determining an affine transformation for transforming a second image so that features of the second image coincide with corresponding features of a first image is provided. The computer-implemented method comprises obtaining the second image comprising the features and obtaining the first image comprising the corresponding features, processing the images by a transformation calculator, thereby determining an indication of whether the affine transformation exists and determining parameters defining the affine transformation, and outputting the affine transformation, comprising outputting the indication of whether the affine transformation exists and outputting a data structure indicative of the parameters defining the affine transformation.

The affine transformation can be a general transformation thus comprising parameters defining a stretching and/or rotation and/or shifting of portions of the second image so that features of the second image would coincide with the features of the first image. Such an affine transformation, however, only exists if the first image and the second image have features in common and if the images are taken in a manner that an affine transformation can be calculated (for example both images are taken with sufficient quality).

By determining whether the affine transformation exists, it is ensured that the parameters obtained for defining the affine transformation will indeed result in a transformation of the second image by applying the affine transformation so that the features of this second image coincide with the corresponding features of the first image. While parameters defining an affine transformation would potentially also be determinable even in cases where an affine transformation does not exist between the respective images, these parameters would be highly inaccurate, making the affine transformation usually useless when attempting to transform the second image so that its features coincide with corresponding features in the first image.

The indication of whether the affine transformation exists can, for example, be obtained based on the accuracy with which the parameters of the affine transformation can be determined. For example, as part of a sanity check, after having determined the parameters defining the affine transformation and their accuracy, it can be determined whether these parameters are sufficiently reliable (for example have an accuracy of a given minimum value or an associated standard deviation not exceeding a given maximum value). If so, an indication can be obtained that the affine transformation exists. If not, the indication can indicate that the affine transformation does not exist. Additionally, other means of obtaining the indication can be thought of.

The computer-implemented method according to the above and any of the below embodiments can preferably be executed on a mobile device, particularly a smartphone or a tablet comprising at least one, potentially more than one, two or three for example) optical sensors (cameras) for obtaining the first and second images.

With the computer-implemented method according to this disclosure, the user is less restricted in how he or she obtains the first and second images as long as some features in the first and second image are corresponding to each other, irrespective of the relative position of these features to, for example, an optical sensor obtaining the first and the second image. By determining an affine transformation that results in a proper transformation of the second image, it is possible to obtain a combined image from the first and second image that can later be used for highly accurate user identification.

In one embodiment, the method further comprises modifying the second image using the affine transformation, thereby obtaining a modified second image and combining at least a portion of the modified second image with at least a portion of the first image to obtain a combined image.

The combined image can be a full combination of the first image and the second image where, in an overlapping region where the features of the second image have corresponding features of the first image, either portions of the first image and/or portions of the second image are provided. With this, a combined image that comprises more information than each of the first and the second image in isolation is provided. Biometric information deduced from this combined image can be used for identifying a user with high accuracy while reducing the restrictions to a user for taking the first and the second image.

In one embodiment, the combined image comprises, in an overlapping region of the first image and the modified second image, a portion of the first image and/or a portion of the modified second image.

Which of the portions of the first or second image are taken can depend for example on the quality (like for example the contrast) of the respective portions of the images compared to each other. It can be preferred that either only portions of the first image or only portions of the second image are taken by default in the overlapping region or that, depending on other characteristics, like for example the quality referred to above, it is determined which portion of the first or second image is taken in used in the overlapping region.

The indication can have a first value if the affine transformation exists and a second value if the affine transformation does not exist, wherein the first value and the second value are different from each other.

Particularly, the indication can be a binary value which indicates that the affine transformation exists if the value is 1 (or 0) or indicates that the affine transformation does not exist if the value is 0 (or 1). The determination of whether or not the affine transformation exists can for example depend on a relative or absolute error with which the parameters defining the affine transformation can be determined. If this error exceeds a particular threshold, for example, this can be indicative of no affine transformation existing that could transform the second image so that features of the second image coincide with corresponding features of a first image.

It can be provided that the transformation calculator comprises a neural network for processing the image.

Neural networks are particularly suitable for performing pattern recognition or approximation. As finding the affine transformation is one specific case of a function approximation or prediction, neural networks can be employed particularly advantageous in the context of the present disclosure not only for reducing the processing time but also for improving the accuracy of determining the affine transformation.

The neural network can comprise a feature extraction part that processes the first image and the second image independently and obtains first image features from the first image and second image features from the second image and, in the processing order of information, the neural network can further comprise a feature processing part that processes the first image features and the second image features to obtain the data structure and the indication.

The feature extraction part may particularly be identical for both the first and second image so that no systematic errors of different size occur when processing the first image and the second image by the feature extraction part separately. The obtained first image features and the second image features can for example be coordinates of the features in the first image and the corresponding features in the second image or any other information that can be used in order to determine the affine transformation.

The first image features and the second image features are then processed preferably together by the feature processing part to determine the parameters defining the affine transformation and also the indication.

The errors in determining the affine transformation are further reduced with this architecture.

In one embodiment, the feature extraction part comprises at least one of a depthwise convolution, a separable convolution, a two-dimensional convolution, a separable two-dimensional convolution, and a depthwise separable two-dimensional convolution. These types of convolutions are particularly suitable for obtaining, at a comparably low size of the architecture of the neural network, the first image features and the second image features from the first and second images. This can make the method applicable to be provided as an application on mobile devices, like smartphones or tablets, thereby reducing the need for remote connections for processing the images.

In one embodiment, the first image features and the second image features are vectors. Such vectors can be processed further by the feature processing part in a reliable manner.

The feature processing part can comprise, in processing order as last layers, a reduction layer reducing a dimension of an input received to 1 and a dense layer, wherein the dense layer determines, based on input received from the reduction layer, the parameters defining the affine transformation and the indication.

The reduction layer can comprise exactly one layer or more than one layer. In any case, the reduction layer processes input received from a preceding layer so that the input is modified with respect to its dimensionality. This is done by the reduction layer so that the output of the reduction layer is 1-dimensional so that the dense layer can understand and process the output of the reduction layer and can determine the affine transformation and the indication therefrom. Preferably, this reducing of the dimensionality of the input received is performed without information loss. However, the reduction layer is not further restricted as long as the above functionality is achieved.

The reduction layer may for example comprise a GlobalMaxPooling layer and/or a GlobalAveragePooling layer and/or a flatten layer and/or a pointwise convolution.

Layers preceding the reduction layer and the dense layer can for example comprise further convolutions and/or depthwise separable convolutions or other layers that process the first image features and the second image features. As the dense layer uses information of all neurons or nodes of the reduction layer, the determined parameters defining the affine transformation are obtained with high accuracy.

It can be provided that, for determining the parameters of the affine transformation, a first cost function is used and, for determining the indication, a second cost function is used.

The first cost function can for example be or comprise a mean absolute loss function or a mean squared loss function. Such cost functions are particularly advantageous because they allow for reducing the error in determining the parameters defining the affine transformation. Independent of how the first cost function is realized, the second cost function can for example be a binary cross-entropy function. This function allows providing for a reasonable output indicating whether or not (i.e. a binary decision) an affine transformation exists. For the case at hand, namely the question whether the affine transformation exists, such an approach is most useful as it is not possible for an affine transformation to exist partially and the decision whether or not such a transformation exists will always be a binary decision.

Particularly, the first cost function and the second cost function can be different. While it could in principle be possible to essentially use the same cost functions, using different cost functions has the advantage of cost functions being chosen that are particularly suited for the problem to be solved, namely to either determine whether an affine transformation exists or to determine the parameters defining the affine transformation.

In one embodiment, the first image and the second image are images of an object carrying a biometric characteristic and wherein the features and the corresponding features are biometric features of the biometric characteristic. The biometric characteristic can, for example, comprise a fingerprint where the biometric features can, for example, be minutiae of the fingerprint.

With this, the method can particularly be employed in matching and combining images of biometric characteristics of a user for identification purposes with high accuracy.

In one embodiment, the method comprises, after obtaining and before processing the images, resizing at least one of the images to a target size. Such resizing can be done before obtaining the affine transformation while processing so that the affine transformation can be determined in a reliable way.

It can be provided that the resizing comprises determining a frequency of the features and/or a frequency of the corresponding features and resizing the first image and/or the second image so that the frequency of the features and/or the frequency of the corresponding features meets a target frequency.

The frequencies can be obtained by for example fast Fourier transformation and can for example constitute the frequency of ridges of a fingerprint. Such frequencies can usually be determined in a highly reliable manner also allowing for neglecting less important frequencies of higher order and for example focusing only on the low frequencies having the highest impact (depending on their weights for example) so as to reliably determine the necessary resizing.

Furthermore, according to this disclosure, a computing device comprising a processor and a storage device is provided, the storage device comprising computer-executable instructions that, when executed by the processor, cause the computing device to perform a computer-implemented method according to any of the above embodiments, wherein, optionally, the computing device is a mobile device comprising an optical sensor for obtaining the first image and/or the second image.

The optical sensor can particularly be embodied as at least one camera (or two or more cameras as available in current smartphones). With this computing device, means are provided that, for example, allow the identification of a user by images taken from a body part with high accuracy.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
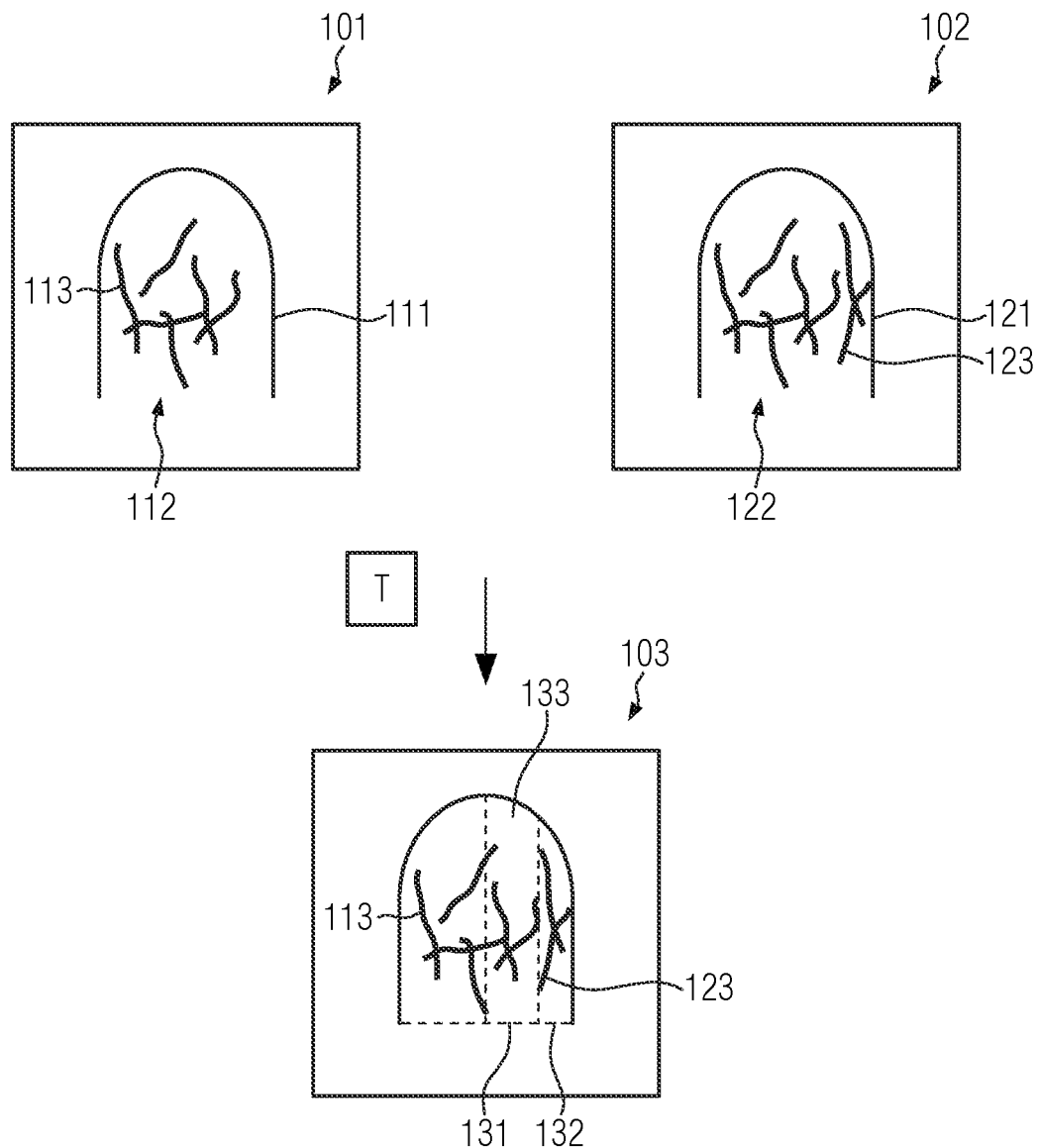
FIG. 1 illustrates two images that are combined into a combined image using an affine transformation.

FIG. 1 is provided to give general explanations in the context of the present disclosure.

In FIG. 1, two images 101 and 102 of objects 111 and 121 are shown. In the example shown in FIG. 1, these objects are fingertips of a user who, for example, wants to identify him or herself using the fingerprints 112 and 122. These fingerprints 112 and 122 in the respective images 101 and 102 comprise several features 123 for the fingerprint 122 in the second image and 113 in the fingerprint 112.

The features 113 and 123 may, for example, be minutiae or other features of the object. In this context, it is noted that this disclosure is not limited to the objects being fingers or fingertips but can, for example, also encompass the face of the user and/or the iris of the user or any other objects that comprise biometric characteristics of a user as far as the method discussed in the following is used to identify a user. However, in the most general context, this disclosure is related to two arbitrary images of arbitrary objects that carry particular features, are present in both the first and the second image.

Particularly in the context of identifying a user using features of objects like for example the minutiae 113 and 123, it is preferred that as many biometric features as possible are taken to identify a user using its biometric characteristic (like its fingerprint).

As the finger usually cannot be photographed using a single image because it is a 3-D object comprising curvature, it would be necessary to use more than one image (at least two images in the context of the present disclosure) to have images with as many biometric features as possible. However, for reliable identification, it is usually necessary to have a single image where the respective biometric features are arranged relative to each other as they are on the actual finger.

In one embodiment of the present disclosure, it is therefore intended to obtain a combined image 103 that comprises at least a portion 131 of the first image and at least a portion 132 of the second image and may additionally comprise a portion 133 representing an overlapping portion of the first image 101 and the second image 102. Using the fingerprint as an example, this combined image 103 comprises a first portion 131 of the first image where biometric features like the minutiae 113 are present and the combined image 103 comprises a second portion 132 where biometric features 123 of the second image 102 are present. In the overlapping region 133, either a portion of the first image or a portion of the second image or both portions of the first image and portions of the second image can be provided.

However, in order for the biometric features depicted in the combined image to be arranged as they are actually arranged on the finger of the user, it is necessary to combine the first image 101 and the second image 102 in a manner so that their spatial arrangement fits even though the user may have taken the images 101 and 102 under different angles. This frees the user from having to photograph his finger under very specific circumstances, thereby improving the user accessibility.

In order to obtain the combined image 103, it is therefore necessary to identify, based on features that the first image and the second image have in common, an affine transformation T that transforms the features of the second image 102 into the corresponding features of the first image 101.

In this context, it is noted that an affine transformation T that transforms features of a first image that appear to be present in a second image or vice versa can always be determined numerically. However, the affine transformation calculated will have limited accuracy and in cases where it is actually not even possible to find a corresponding affine transformation, the relative and absolute errors associated with the parameters defining the affine transformation are very large and therefore the reliability with which the affine transformation results in a transformation of the features of the first image into corresponding features of the second image so that they coincide can be small and thus not suitable for identifying a user.

With the method according to embodiments of the present disclosure, it is possible to determine the affine transformation T in a reliable manner, ensuring that this transformation actually exists. Thereby, it is ensured that the affine transformation that is calculated indeed results in a transformation of the second image so that features of the second image reliably coincide with corresponding feature of the first image making it possible to use a combined image obtained from the first and second image for identifying the user or other purposes.

Figure 2:
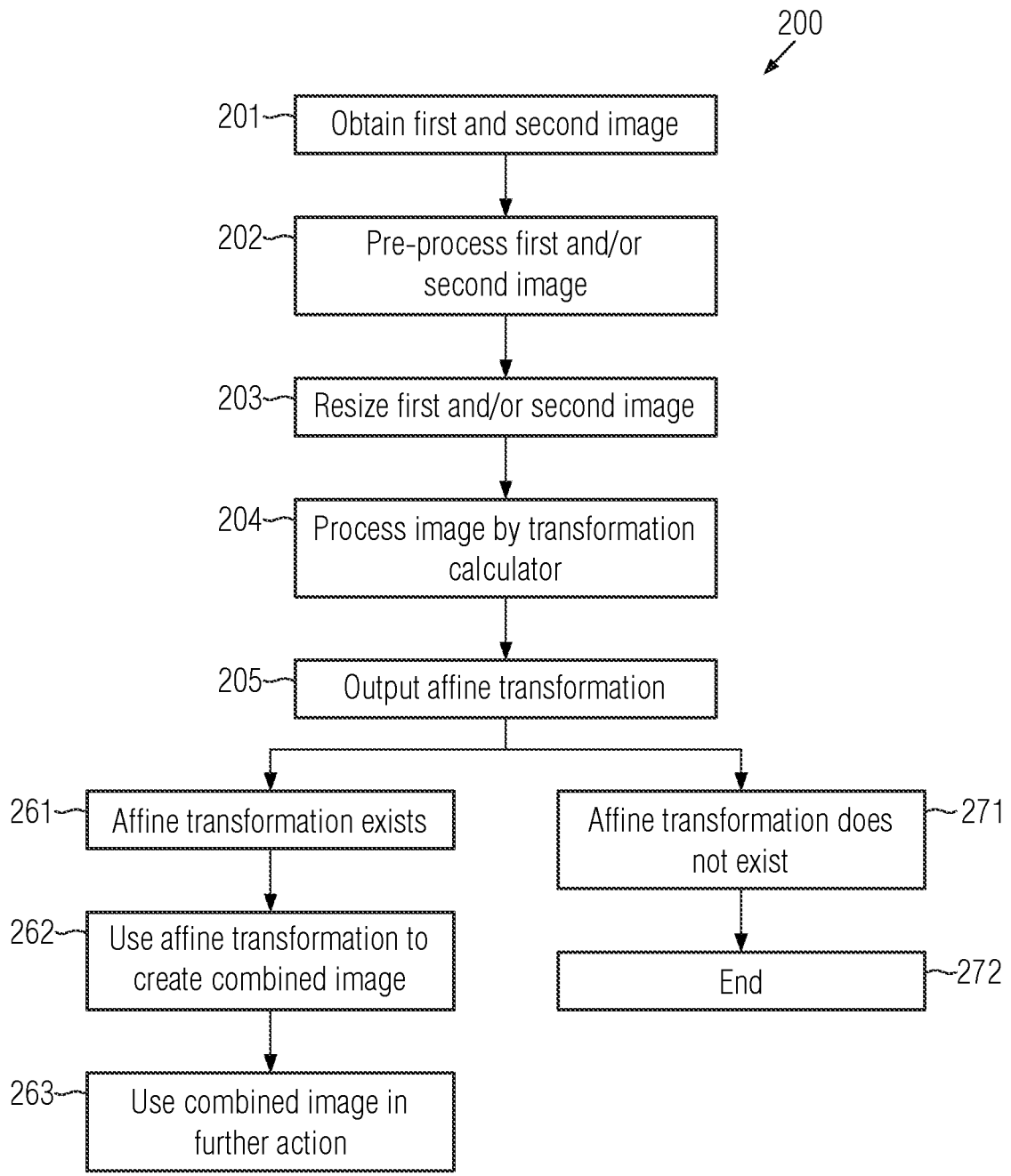
FIG. 2 illustrates a flow chart of an embodiment of a method according to this disclosure.

FIG. 2 shows a flow chart of a method 200 according to one embodiment of the disclosure.

The method begins with step 201 where a first image and a second image of a particular object are obtained. Step 201 can for example be executed by an optical sensor like a camera of a smartphone. It can be preferred that all further steps of the method are likewise executed on the same device that obtained the first and second image in step 201, particularly all steps of the method 200 are executed on a mobile device like a smartphone or a tablet where the mobile device can optionally comprise at least one optical sensor, particularly at least one camera to obtain the first and/or second image.

After having obtained the first and the second image, it is optionally possible that one or more pre-processing steps 202 are performed on the first and/or second image. Such pre-processing may, for example, comprise a binarizing (convert the image into a black and white image) of the first and/second image to make it easier to identify for example relevant features like biometric features. Alternatively or additionally it may also be part of the pre-processing to crop the first and/or second images so as to separate those portions of the first and/or second image that exhibit the relevant features (like for example the biometric characteristic or the finger of the user) from other portions of the image and only process those cropped portions instead of the whole images. This can reduce the computational effort in determining the affine transformation while at the same time achieving reliable results in determining the affine transformation.

However, step 202 is only optional and does not necessarily need to be provided.

In addition or alternatively to step 202, an optional resizing step for the first and/or second image can be provided as step 203. Step 203 can comprise resizing the first image and/or the second image to a particular target size. The same may hold if only portions of the first and/second images have been cropped in step 202 so that those cropped portions can be resized. The resizing can be done so that the relevant features (like for example the biometric features) are presented in the to be processed images with a particular minimum resolution or defined resolution like for example 500 dpi.

In order to achieve this, it can be provided that for resizing the first and/or second images, a determination of a frequency of the features (like minutiae) and/or a frequency of the corresponding features in the other image is performed. It is noted that the features based on which the resizing is performed are not necessarily the same features that are used in the further process to determine the affine transformation.

Determining the frequency can for example comprise performing fast Fourier transformation on the features in order to determine their frequency and using those frequencies with the highest weight (for example the frequencies associated with the two highest weights or the 5 highest weights or only the frequency associated with the highest weight) or frequencies up to a given threshold to determine the feature frequency. Based on the determined feature frequency, resizing the first and/or the second image using the determined feature frequency can be performed so that the resized image has a feature frequency that matches a target frequency. Thereby, an at least approximate matching of the size of the images and particularly of the size of the features is obtained that can simplify the further processing resulting in improved accuracy of the affine transformation determined.

According to this disclosure, in step 204, either the pre-processed and/or resized or the original first and/or second images are further processed using a transformation calculator. The transformation calculator can for example be realized as or comprise a neural network as will be explained in relation to FIGS. 3 and 4 or it can be an algorithmic calculator not using a neural network. In any case, the transformation calculator is used to determine, from the input (i.e. the first and/or second image potentially pre-processed and/or resized in steps 202 and 203), an affine transformation that transforms features of the second image so that these features coincide with corresponding features of the first image.

This affine transformation can generally be represented in the form of a matrix having nine freely-selectable parameters. These freely-selectable parameters define how the features in the second image (and consequently the second image) have to be transformed so as to coincide with the same features in the first image. This does not mean that all features in the second image must have potentially coinciding features in the first image but that at least for some of them, such potentially coinciding features exist.

The up to nine freely-selectable parameters that can be set in two-dimensional space when calculating an affine transformation comprise two translational parameters (movement of the respective features along two dimensions), two parameters defining mirroring along the two coordinate axes, two independent parameters defining scaling along the two axes and two parameters defining sheering along the respective axes. An additional further parameter defines potential relative rotations of the features.

By determining the values of these parameters, the affine transformation is ultimately defined.

However, the affine transformation only exists if the features in the second image and the potentially corresponding features in the first image are visible in the first and second image and can indeed be translated into each other. If there are fewer features in the first image and the second image that correspond to each other than there are parameters to be determined (for example only 6 corresponding features while nine parameters need to be determined), for example, it is not possible to determine the affine transformation as the freely-selectable parameters can not be determined without having the coordinates of at least nine features existing in the first image and the second image.

Moreover, the first image and the second image must have sufficient quality so as to allow for actually identifying the respective features and determining the respective parameters of the affine transformation with sufficient accuracy.

Therefore, as part of step 204, the transformation calculator does not only determine the parameters of the affine transformation but also determines an indication of whether or not the affine transformation actually exists. This indication can for example be a binary value that can be obtained from error margins calculated for the determined parameters of the affine transformation. If these exceed a particular threshold, for example, the transformation calculator can conclude that even though parameters defining an affine transformation have been determined, they are so unreliable that it is more likely that no affine transformation exists. The indication can particularly be a value of 0 (or 1) if the affine transformation exists and 1 (or 0) if no affine transformation exists. As the decision of whether or not an affine transformation exists is a binary decision, providing a one-bit indicator is sufficient for this indication.

Having determined in step 204 the affine transformation and the indication, in step 205, the affine transformation (potentially together with the indication) can be output for further processing. Outputting in this context does not require displaying the affine transformation but at least requires outputting the affine transformation (or the parameters defining the same), potentially together with the indication to another portion of software.

If the affine transformation exists (261), then this affine transformation can be used to create a combined image as was explained in relation to FIG. 1. This can be done in step 262. Having obtained the combined image, the combined image can be used in step 263 optionally for performing any other action. This action may for example comprise using the combined image for identifying a user for example during a log-in procedure that either takes place locally on the device carrying out the method (like the smartphone discussed above already) or that takes place remotely. It the latter case, it can for example be provided that the combined image is sent to an identification server for identifying the user based on the biometric features visible in the combined image. As the accuracy with which the combined image is obtained by using the affine transformation is high, the reliability of the identification process will also be high.

If it is determined based on the indication that the affine transformation does not exist in step 271, then the method can end 272. Ending the method in step 272 can either comprise completely aborting any further processing or it can comprise providing an indication to a user of the device (for example by displaying information our outputting an acoustic signal) that the method 200 is to be repeated by taking new first and second images, thereby returning to step 201 and performing the method 200 again.

As already explained above, the transformation calculator used can either be an algorithmic or deterministic transformation calculator that does particularly not employ a neural network or the transformation calculator can comprise a neural network that processes the input (the first and second image or the respective processed images according to steps 202 and/or 203) in order to determine the affine transformation.

Algorithmic or deterministic transformation calculators are in general known to the skilled person in general and will not be explained further in the following. However, for achieving high accuracy in determining the affine transformation, a particularly designed and trained neural network can be used, as will be explained in relation to FIGS. 3 and 4.

Figure 3:
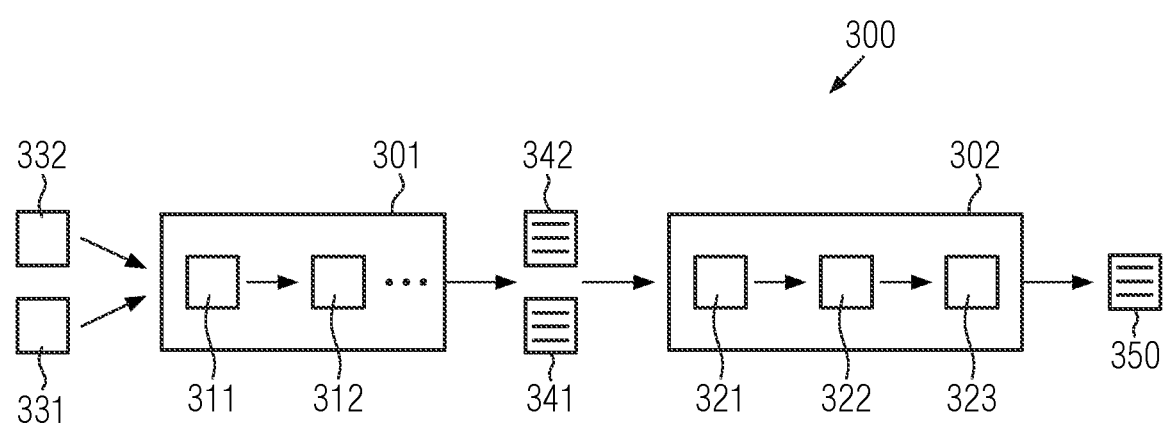
FIG. 3 illustrates a schematic depiction of a neural network employed in embodiments of this disclosure.

In FIG. 3, a schematic depiction of a neural network 300 according to one embodiment is shown. This neural network 300 may be employed as transformation calculator or part of the transformation calculator.

In the processing order of information through the neural network 300 (shown from left to right in FIG. 3), the neural network comprises a feature extraction part 301 and a feature processing part 302. It is noted that the description below assumes, for ease of understanding, basically, that the neural network comprises a single channel. However, it is clear to the skilled person that the neural network will include a plurality of channels and the output of layers of the neural network will generally be a tensor having a size M×N×C with C denoting the number of channels and N and M, basically, corresponding to or depending on the size of the input image.

The feature extraction part 301 receives the two images 331 and 332 based on which the affine transformation is to be obtained. These can either be the obtained first and second images according to step 201 of FIG. 2 or for example pre-processed and/or resized images according to steps 202 and 203.

In the feature extraction part 301, these images are processed independently to obtain first image features 341 and second image features 342 which may, for example, be representable in the form of a vector or matrix containing information at least on the features and the corresponding features in the first and second images. Particularly, the first and second image features may define locations in the first and second image, respectively, where the features are positioned. For example, the first and second image features may comprise entries for each pixel in the respective image defining the coordinates of the pixel and a label identifying to which feature the pixel belongs or whether it does not belong to one of the features at all. Generally, such image features can be provided for separate channels or the image features for the channels of each image can be stacked to a single image feature of the respective image.

The feature extraction part can generally be any part of a neural network comprising arbitrary layers. However, it has been found that convolutions and particularly depthwise convolutions making up the feature extraction part are most advantageous particularly in terms of size of the neural network 300, allowing for implementation and execution of the neural network on a mobile device only. Instead of a depthwise convolution, also other realizations can be advantageous, including any of a separable convolution, a two-dimensional convolution, a separable two-dimensional convolution, a depthwise two-dimensional convolution.

In any case, the output of these layers to a penultimate layer of the neural network (as will be discussed further below) will be a tensor of dimension M×N×C with C denoting the number of channels of the neural network.

The feature extraction part is however not limited to a particular number of convolutions. Preferably, there are at least two convolutions 311 and 312 but more are possible.

The neural network 300 further comprises, as mentioned above, the feature processing part 302. The feature processing part 302 receives from the feature extraction part 301 the first image features 341 and the second image features 342 and is designed to simultaneously process these image features 341 and 342 to thereby determine the affine transformation and the indication of whether or not the affine transformation exists as output 350.

In order to do so, the feature processing part comprises, in processing order of the first and second image features through the feature processing part, preferably at least a penultimate layer that is realized as a reduction layer 322 and a last layer that is realized as a dense layer 323. The reduction layer reduces the dimensionality of the input received from a general tensor having dimension N×D (where N can constitute a matrix or tensor or vector) to 1×D, preferably without information loss. This can be achieved by realizing the reduction layer as a layer that rearranges the elements of the N×D tensor received as input so that an output of the reduction layer has dimension 1×D. Generally, such layers are known and can comprise, for example, a GlobalMaxPooling layer and/or a GlobalAveragePooling layer and/or a flatten layer and/or a pointwise convolution. While other realizations are possible, this is the most preferred realization where the dense layer predicts or determines the parameters defining the affine transformation and also determines the indication.

The feature processing part may further comprise one or more preceding layers 321 before layers 322 and 323 that process the first and second image features and may for example be realized as convolutions as well.

It can be provided that during the processing of the first and second image features in the feature processing part, cost functions are employed that are optionally different with respect to determining the parameters defining the affine transformation and determining the indication of whether the affine transformation exists. In one preferred embodiment, the cost function used for determining the parameters defining the affine transformation comprises at least one of a mean absolute loss or a mean squared loss function as these functions can be used to determine the parameters of the affine transformation with high accuracy. For determining the indication, a binary cross entropy function can be used which can be designed to output a binary value (i.e. either 0 or 1) and is therefore most suitable for providing an indication on the binary decision on whether or not an affine transformation actually exists.

The above-described network architecture is particularly advantageous as it can reliably determine whether the affine transformation exists and, if so, a highly accurate affine transformation can be obtained as output 350 so as to use the affine transformation further for example in additional actions like the actions described in relation to step 263 of FIG. 2.

Preferably, the neural network 300 is a trained neural network so that when employed on the mobile device it can perform its function of determining the affine transformation and the indication as output 350 upon receiving the respective input images 331 and 332 without requiring further training.

For training the neural network 300 and particularly training the network parameters of all layers of the neural network, a training method as the one described below can be used.

Figure 4:
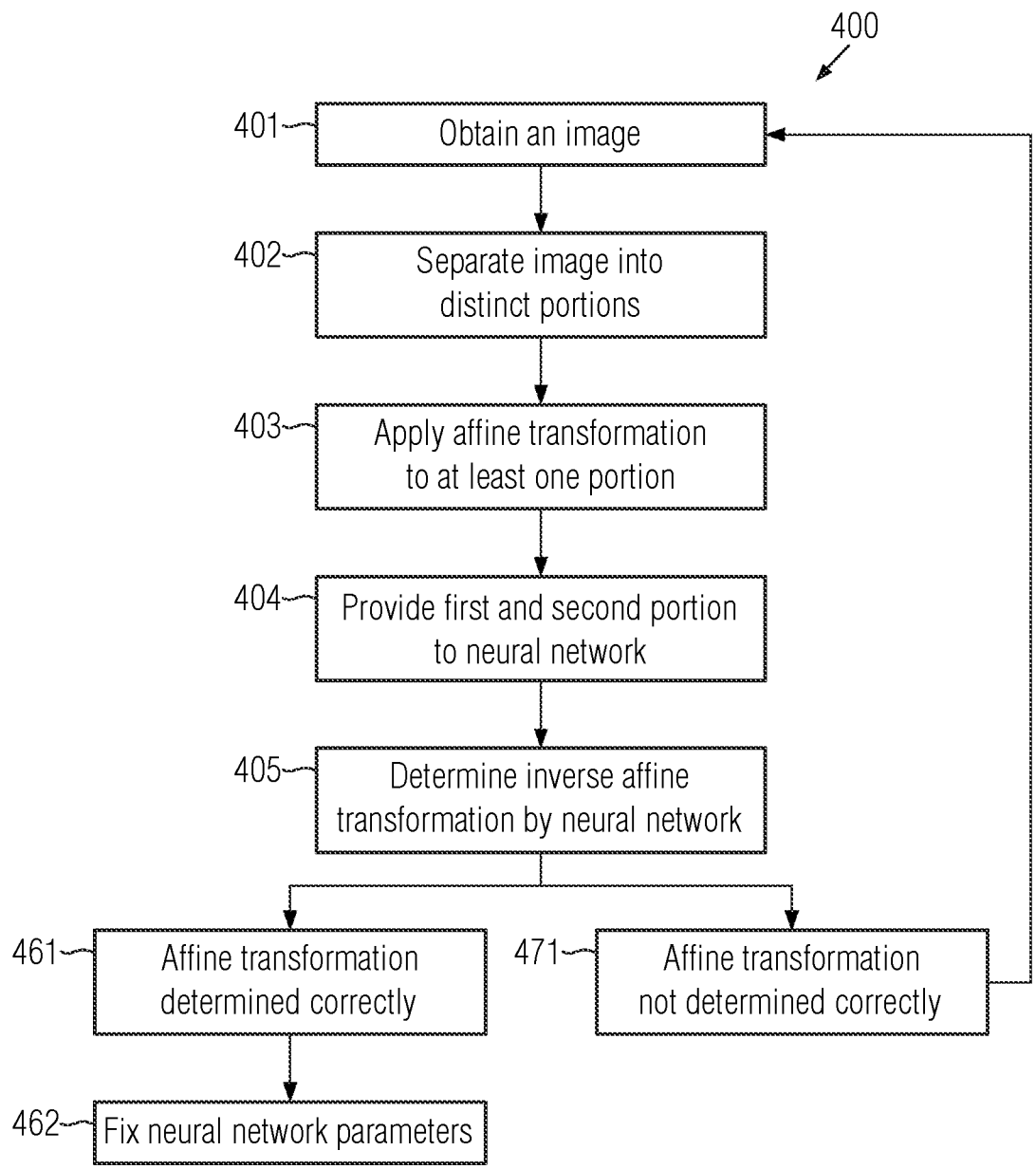
FIG. 4 illustrates a flow chart of a method for training a neural network.

FIG. 4 shows a flow chart of a method for training a neural network like for example the neural network 300 of FIG. 3.

As there is currently no publicly available database existing that would provide images of objects where particular features partially overlap and that have particular features in common (like for example fingers photographed under different angles showing at least partially overlapping areas), the now-described method provides such images in a creation step of the training method. With this approach, it is not only not necessary to rely on existing databases but the training can be rendered more efficient because the affine transformations are precisely known.

The method 400 begins with step 401 comprising obtaining an image. Obtaining an image particularly may comprise obtaining an image of an object that has particular features like for example a finger or a fingertip where the features may minutiae.

In step 402, the image can be separated into distinct portions or, also referred to a first image and a second image, where these terms are only used for ease of understanding in view of what has been described previously.

The separated portions or first and second images according to step 402 do at least partially overlap, i.e. part of the distinct portions is identical. For example, taking an image of a fingertip in step 401, it may be separated into distinct portions by separating the fingertip in half along a particular line. The part of the image that is on the left of the line may constitute the first image and the part of the image on the right may constitute the second image. This first and second image have no parts in common. In addition to that, an overlapping region may then be added to each image by adding, to the first image, 10% or 20% or more (preferably up to no more than 50%) of the second image and vice versa. Thereby, the first and second images thusly created comprise portions that are distinct from each other and portions that are identical to each other, representing an overlapping area of the respective images.

In step 403, an affine transformation is applied to at least one of the portions or images created in step 402. Without loss of generality, however, and in view of processing efficiency, it can be assumed that an affine transformation is only applied to the second image. The affine transformation is preset and known and can have arbitrary values for the freely-selectable parameters of the affine transformation (up to nine independent parameters). For training the neural network, it is, however, basically irrelevant how the affine transformation is set as long as it is assured that preferably not always the same parameters of the affine transformation are used when the procedure described in the following is executed repeatedly so as to train the parameters of the neural network. Thereby bias can be avoided.

After step 403, there are thus two images where one of the images constitutes a first image and the other image constitutes a second image where the first and second image have features in common but the second image has undergone an affine transformation and was, for example, tilted or stretched along one direction.

In step 404, these first and second images are provided to a neural network. The neural network (for example the neural network described in relation to FIG. 3) then processes the first and second image in an attempt to determine the inverse affine transformation that is inverse to the affine transformation previously used to create the second image and an indication of whether the affine transformation exists.

Determining the inverse affine transformation means that the neural network attempts to find an affine transformation T−1 that modifies the second image so that the product of transformations T−1A=1, where A is the affine transformation used in step 403 and 1 is the identity in the space of T−1 and A. Applying these transformations to for example image features f represented in the form of a general matrix of appropriate size, this will result in the image features f that equal the application of the affine transformation to the original features o, Ao=f being transformed so that the original features are obtained, because T−1f=T−1Ao=o. The transformation applied in step 403 would thus ideally be reversed by the neural network by determining the inverse affine transformation.

Upon determining the parameters of the affine transformation in step 405, it can be checked whether the affine transformation output by the neural network (and also the indication of whether or not the affine transformation exists) is correct or within a failure tolerance. If it is determined that the affine transformation is correct in step 461 (preferably after having correctly determined the affine transformation for all images in the training set at least once with the same set of parameters of the neural network), the parameters of the neural network that lead to this result can be fixed and the neural network can for example be transferred to a mobile device for further use in the sense of the method described in FIG. 2.

If, on the other hand, it is determined that the affine transformation is not correct in step 471 (the usual case during learning or training of neural network), the neural network parameters can be modified (for example based on the results achieved using the respective cost functions) and a new run of the training, i.e. steps 401 to 405 can be done, starting either from the same image and the same transformation or using a new image and/or a new transformation. Once a steady state of the neural network is reached, i.e. the parameters correctly determine the affine transformation within an allowable error margin for all images used as the training set, the neural network parameters can be fixed in step 462 and the neural network can be used in the further processing of images for example on a smartphone.

Figure 5:
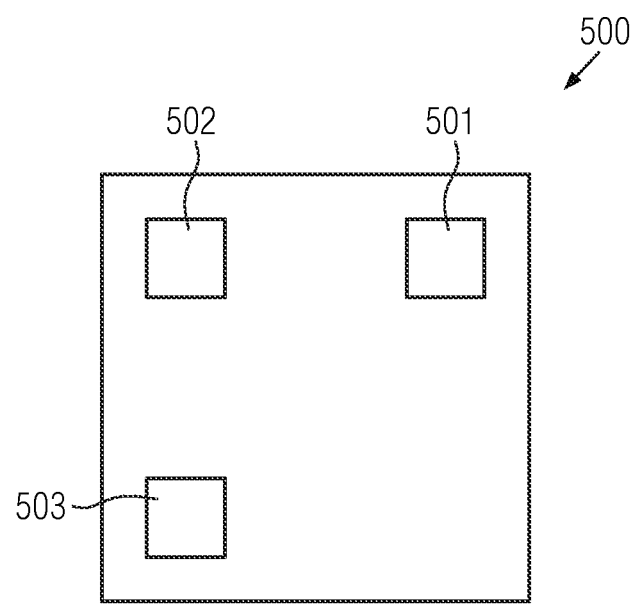
FIG. 5 illustrates an embodiment of a computing device.

FIG. 5 exemplarily depicts a computing device 500 with which any of the above embodiments can be realized.

The computing device 500 comprises at least a processor 501 and an associated storage device (for example a hard drive or flash memory). The storage devices comprises at least executable instructions that, when executed by the processor 501, cause the processor to execute a method as the one described above in relation to FIGS. 1 and 2. Potentially, it can also be provided that the computing device is adapted to train a neural network as described in relation to FIGS. 3 and 4 until the parameters of the neural network are fixed and it can be further used on the computing device for determining affine transformations for transforming a second image so that features of the second image coincide with corresponding features of the first image and/or to obtain a combined image as described in any of the above embodiments.

Optionally, the computing device 500 may comprise an optical sensor 503 for obtaining the first and second image. The images obtained by the optical sensor 503 (like a camera) can then be provided to the storage device and further processed according to any of the above embodiments. Alternatively or additionally, the element 503 may be or may comprise a receiver for receiving data from a remote data source, for example via the internet. For example, the computing device can receive, from an image source, the first and second image for further processing as described above.

Although the present disclosure has been described with various embodiments, various changes and modifications may be suggested to one skilled in the art. It is intended that the present disclosure encompass such changes and modifications as falling within the scope of the claims.

The present disclosure should not be read as implying that any particular element, step, or function is an essential element, step, or function that must be included in the scope of the claims. Moreover, the claims are not intended to invoke 35 U.S.C. § 112 (f) unless the exact words "means for" are followed by a participle.

What is claimed is:

1. A computer-implemented method for determining an affine transformation for transforming a second image so that features of the second image coincide with corresponding features of a first image, the computer-implemented method comprising:
   obtaining the second image comprising the features and obtaining the first image comprising the corresponding features;
   processing the first and second images by a transformation calculator, thereby determining an indication of whether the affine transformation exists and determining parameters defining the affine transformation; and
   outputting the affine transformation, comprising outputting the indication of whether the affine transformation exists and outputting a data structure indicative of the parameters defining the affine transformation,
   wherein the transformation calculator comprises a neural network for processing the first and second images,
   wherein the neural network comprises a feature extraction part that processes the first image and the second image and obtains first image features from the first image and second image features from the second image, and
   in a processing order of information, the neural network further comprising a feature processing part that processes the first image features and the second image features to obtain the data structure and the indication.

2. The computer-implemented method of claim 1, the method further comprising modifying the second image using the affine transformation, thereby obtaining a modified second image and combining at least a portion of the modified second image with at least a portion of the first image to obtain a combined image.

3. The computer-implemented method of claim 2, wherein the combined image comprises, in an overlapping region of the first image and the modified second image, a portion of the first image and/or a portion of the modified second image.

4. The computer-implemented method of claim 1, wherein the feature extraction part comprises at least one of a depthwise convolution, a separable convolution, a two-dimensional convolution, a separable two-dimensional convolution, and a depthwise two-dimensional convolution.

5. The computer-implemented method of claim 1, wherein the first image features and the second image features are vectors.

6. The computer-implemented method of claim 1, wherein the feature processing part comprises, in a processing order as last layers, a reduction layer reducing a dimension of a received input to 1 and a dense layer, wherein the dense layer determines, based on input received from the reduction layer, the parameters defining the affine transformation and the indication.

7. The computer-implemented method of claim 1, wherein, for determining the parameters of the affine transformation, a first cost function is used and, for determining the indication, a second cost function is used.

8. The computer-implemented method of claim 7, wherein the first cost function and the second cost function are different.

9. The computer-implemented method of claim 1, wherein the first image and the second image are images of an object carrying a biometric characteristic and wherein the features and the corresponding features are biometric features of the biometric characteristic.

10. The computer-implemented method of claim 1, wherein the method comprises, after obtaining and before processing the first and second images, resizing at least one of the first and second images to a target size.

11. The computer-implemented method of claim 10, wherein the resizing comprises determining a frequency of the features and/or a frequency of the corresponding features and resizing the first image and/or the second image so that the frequency of the features and/or the frequency of the corresponding features meets a target frequency.

12. A computing device comprising a processor and a storage device, the storage device comprising computer-executable instructions that, when executed by the processor, cause the computing device to perform the computer-implemented method of claim 1.

13. The computer-implemented method of claim 5, wherein the feature processing part comprises, in processing order as last layers, a reduction layer reducing a dimension of an input received to 1 and a dense layer, wherein the dense layer determines, based on input received from the reduction layer, the parameters defining the affine transformation and the indication.

14. The computer-implemented method of claim 6, wherein, for determining the parameters of the affine transformation, a first cost function is used and, for determining the indication, a second cost function is used.

15. The computer-implemented method of claim 8, wherein the first image and the second image are images of an object carrying a biometric characteristic and wherein the features and the corresponding features are biometric features of the biometric characteristic.

16. The computer-implemented method of claim 9, wherein the method comprises, after obtaining and before processing the images, resizing at least one of the images to a target size.

17. The computing device of claim 12, wherein the computing device is a mobile device comprising an optical sensor for obtaining the first image and/or the second image.

* * * * *